United States Patent [19]

Balakrishnan et al.

[11] Patent Number: 5,381,471
[45] Date of Patent: Jan. 10, 1995

[54] CENTRALIZED SERVICE CIRCUIT DEPLOYMENT

[75] Inventors: Annapurna Balakrishnan, Winfield; Stuart J. Lark, Wheaton; Paul R. Sand, Bolingbrook, all of Ill.

[73] Assignee: AT&T Corp., Murray Hill, N.J.

[21] Appl. No.: 10,962

[22] Filed: Jan. 29, 1993

[51] Int. Cl.6 .......................................... H04M 7/00
[52] U.S. Cl. .................... 379/269; 379/265; 379/220; 379/94; 379/113
[58] Field of Search ............... 379/269, 265, 220, 221, 379/266, 94, 207, 113

[56] References Cited

U.S. PATENT DOCUMENTS

| | | | |
|---|---|---|---|
| 4,348,554 | 9/1982 | Asmuth | 379/207 |
| 4,790,005 | 12/1988 | Hanselka | 379/113 |
| 4,924,386 | 5/1990 | Freedman | 379/113 |
| 4,924,510 | 5/1990 | Le | 379/207 |
| 4,979,118 | 12/1990 | Kheradpir | 379/221 |
| 5,065,392 | 11/1991 | Sibbitt et al. | 379/112 |
| 5,073,890 | 12/1991 | Danielsen | 379/265 |
| 5,105,420 | 4/1992 | Ardon | 379/221 |
| 5,134,709 | 7/1992 | Bi | 379/59 |
| 5,182,750 | 1/1993 | Bales | 379/221 |
| 5,253,288 | 10/1993 | Frey | 379/221 |
| 5,282,244 | 1/1994 | Fuller | 379/207 |

OTHER PUBLICATIONS

R. J. Frank et al., "No. 4 ESS: Mass Announcement Capability", *The Bell System Technical Journal*, vol. 60, No. 6, Jul.-Aug. 1981, pp. 1049–1081.

*Primary Examiner*—James L. Dwyer
*Assistant Examiner*—Michael N. Lau
*Attorney, Agent, or Firm*—Werner Ulrich

[57] ABSTRACT

This invention relates to the minimizing of call set-up time for calls requiring the use of service circuits provided from a separate switching system, such as a service circuit node (SCN). Groups of semi-permanent circuits through a public switched telephone network (PSTN) are allocated to each of the switching systems served by the SCN. Thus, whenever a switching system has a call that requires the use of a service circuit housed in the SCN, the connection is already established. Traffic is controlled by limiting in the size of the semi-permanent circuit groups, but these groups can be made larger or smaller, up to some overall total for the SCN, as traffic to each switching system changes. Advantageously, this arrangement permits efficient use of a large group of service circuits at the SCN, while minimizing the total call set-up time.

12 Claims, 3 Drawing Sheets

CENTRALIZED SERVICE CIRCUIT DEPLOYMENT

TECHNICAL FIELD

This invention relates to the allocation of resources such as service circuits to telecommunications calls.

PROBLEM

Modern telecommunications systems are making increasing use of intelligent service circuits, such as those having speech recognition and flexible announcement capabilities, for implementing telecommunications services. Among the services that use this type of intelligent service circuit are automated calling card and voice messaging services. Since these intelligent service circuits are relatively expensive and since they frequently use a common resource such as a large data base, it has been found economical to centralize these intelligent service circuits in a service circuit node (SCN) accessible from a number of switches. Alternatively, such service circuits could also be provided from each switch. Both of these arrangements have disadvantages. By providing service circuits in each switch, the size of the service circuit group is kept relatively small and so these service circuits tend to be under-utilized as are any members of a small group of common facilities. On the other hand, by concentrating the service circuits at a SCN, a delay is encountered in serving a call because of the need to establish a connection from the switch serving the call to the SCN, thence to the service circuit. These actions cause a call set-up delay and further require extensive use of processing resources by the accessing switching system and the accessed SCN. A problem of the prior art therefore is that there is no satisfactory arrangement for providing access to a large and therefore efficiently utilized group of sharable resources, such as intelligent service circuits, without incurring substantial delay and inefficient utilization of resources for controlling the accessing of the service circuits.

SOLUTION

The above problem is solved and an advance is made over the prior art in accordance with this invention wherein a plurality of switching systems are each connected via a group of semi-permanent, i.e., temporarily dedicated and not released between calls, network paths through a public switched telephone network (PSTN) to a system, such as a service circuit node, containing a group of resources, such as intelligent service circuits. Advantageously, this arrangement reduces the call set-up time while still allowing the large centralized service circuit group to be efficiently utilized. In accordance with one aspect of the invention, these semi-permanent PSTN paths are established from the service circuit node to the switches; the number of such paths is changed dynamically in response to the traffic needs of each switch, and/or in accordance with pre-programmed instructions. These semi-permanent PSTN paths are maintained for many calls until a change of allocation is requested. Advantageously, this arrangement permits efficient use of the semi-permanent PSTN network connections, and reduces call set-up time.

In accordance with another aspect of the invention, for cases wherein minimizing the call set-up time is more critical than minimizing the number of service circuits, subgroups of the service circuits are allocated on a semi-permanent basis to each of the connected switches, and a semi-permanent connection is established in the switching network of the service circuit node between the allocated circuits and the semi-permanent PSTN paths. An advantage of this arrangement is that it simplifies the provision of priority service. It is also possible to allocate some service circuits while making others generally available.

For the case wherein more than one service circuit may be required on one call, the desirable arrangement is one wherein only the path through the PSTN is semi-permanent; this permits different service circuits to be connected to that path, concurrently or in sequence via a switching network of the SCN.

In accordance with one specific embodiment of the invention, each dedicated intelligent service circuit is connected through a semi-permanent path in a network within a SCN and a semi-permanent network path connecting the switch and the SCN to one port in the accessing switch; advantageously, by connecting a requester to one of the ports, the accessing switch directly completes a connection to one of the intelligent service circuits.

In accordance with one aspect of the invention, the size of the subgroup of semi-permanent PSTN paths and/or service circuits allocated to a particular switch is varied in order to respond to changes in traffic so that the size of the subgroup from a switch generating an unusually large amount of traffic for that switch is increased and the size of the subgroup for a switch generating a relatively low amount of traffic for that switch is decreased.

In accordance with another aspect of the invention, the size of the subgroups is automatically changed in accordance with a preplanned schedule that takes into account either or both the time of day and the day of the week. Advantageously, known shifts of the traffic pattern can be preplanned so that the number of cases in which no service circuit is available is minimized. Advantageously, such an arrangement provides the advantage of a large centralized group without incurring the delay for setting up a special connection for each use of an intelligent service circuit.

DETAILED DESCRIPTION

Figure 1:
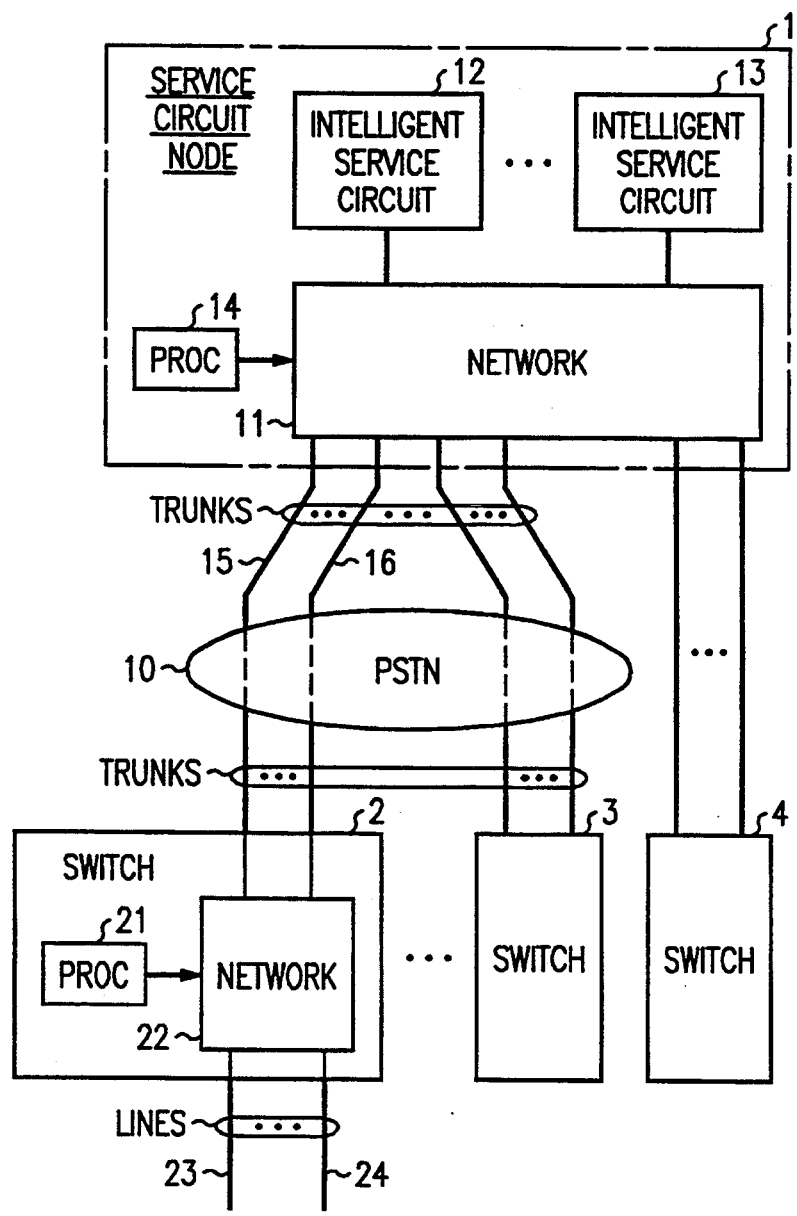
FIG. 1 is a block diagram illustrating the operation of applicant's invention.

FIG. 1 shows a Service Circuit Node (SCN) connected via trunks and the PSTN to a plurality of switches 2, . . . ,3,4. Each switch is connected to the PSTN, thence to the SCN by a plurality of trunks such as trunks 15,16, connecting switch 2, via the PSTN, to SCN 1, the size of the trunk group being adequate to carry the demand for the largest number of intelligent service circuits expected to be accessed simultaneously from switch 2. FIG. 1 also shows one switch, switch 4, which is connected by direct trunks to SCN 1; this switch may be located close to the SCN. The SCN includes a control processor 14 operative under the control of a program stored therein for controlling operations of the SCN. SCN 1 also includes a network for connecting trunks, such as trunks 15, . . . ,16, to a switching network 11 for connecting trunks etc. to the ones of the intelligent service circuits 12, . . . ,13. Each of the switches 2, . . . ,3,4 contains a processor 21 for controlling operations of the switch, and a switching network 22 for connecting incoming lines or trunks 23, . . . ,24 to ones of trunks 15, . . . ,16 whenever a connection to an intelligent service circuit is required.

Figure 2:
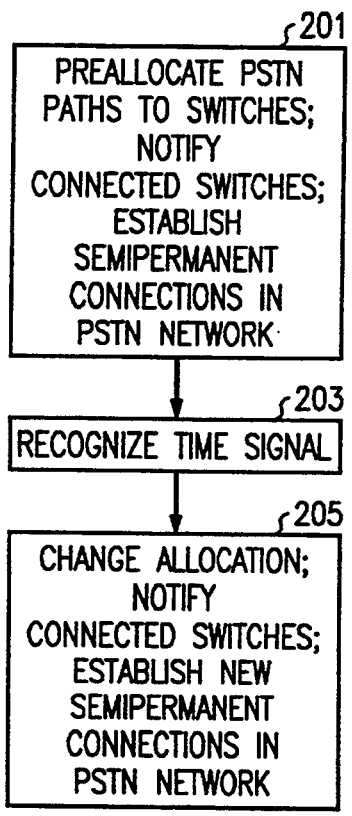
FIGS. 2, 3, and 4 are flow diagrams of programs executed in the SCN, in the switch, and the SCN, respectively, in order to implement the invention.

FIG. 2 is a flow diagram of a program for allocating semi-permanent PSTN connections to different switches. Action block 201 is executed whenever the system is initialized. The initialization comprises pre-allocating PSTN circuits to each of the accessing switches and establishing connections, direct, or via the PSTN to the switches, and notifying the switches that the connection has been established; in some cases, allocated service circuits are then connected in the SCN to these semi-permanent PSTN connections. Subsequently, in response to a time signal such as a shift from day allocation, wherein many service circuits are used by switches handling predominantly business traffic, to evening allocation, wherein many more service circuits are used by switches serving predominantly residential traffic, a change of allocation of semi-permanent PSTN paths is made. In response to the recognition of this timing signal (action block 203), the allocation is changed in accordance with a preplanned arrangement. The actions of block 205 are then executed; some semi-permanent paths are disconnected and others are established, and the connected switches are notified.

The arrangement for allocating semi-permanent connections can also be used, when desirable, for allocating service circuits to particular switches, and for setting up a connection in the SCN switching network between a semi-permanent PSTN path and a service circuit.

Figure 3:
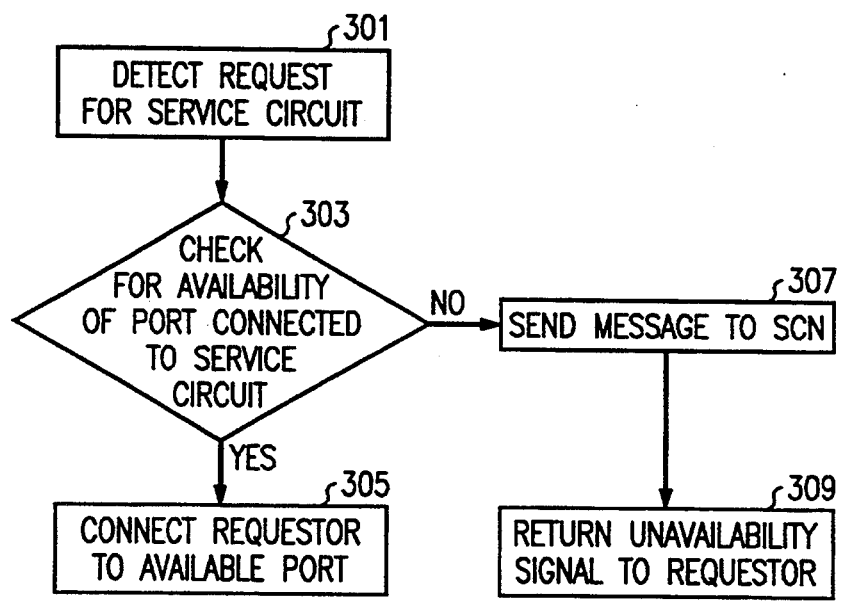

FIG. 3 is a flow diagram of actions performed in the switch. Action block 301 represents the detection of a request for a service circuit. This request is detected during the process of processing a telecommunications call. Test 303 checks for the availability of a port connected to the SCN. If such a port is available, then a connection is set up between the requester and the available port, and therefore the SCN (action block 305). In some cases, the SCN will already have established a connection through its network to the service circuit. If no port is available, then a message is sent to the SCN (action block 307). This message may be sent only if more than one blockage has been encountered within a specific time or in some other way an excessive rate of unavailability of service circuits is detected in the switch. An unavailability signal is then sent to the requester since no service circuit is available for handling the request (action block 309). The requester may queue for a service circuit with the result that another request is initiated whenever a connection to a service circuit is released (action block not shown), or may be simply tried periodically.

Figure 4:
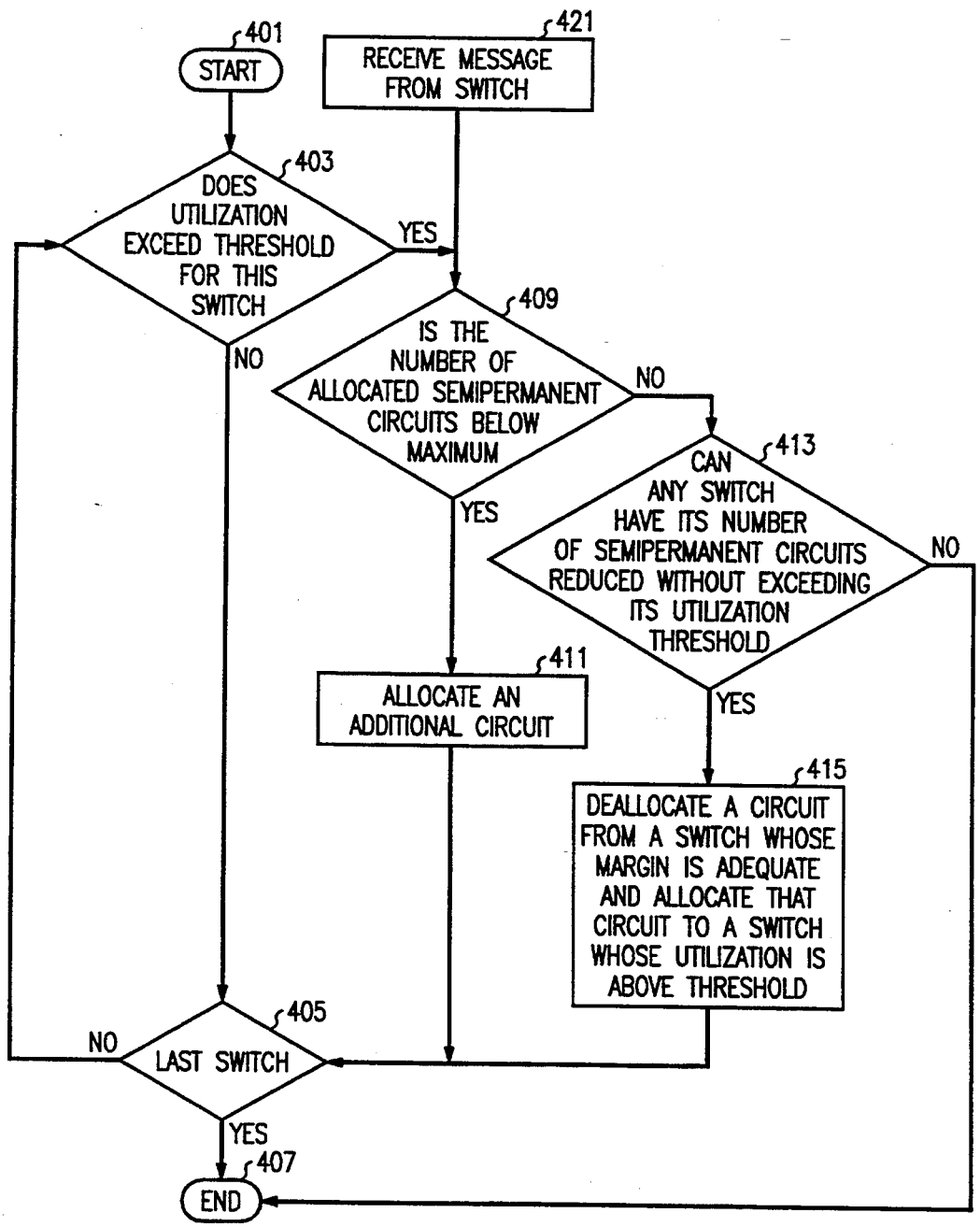

FIG. 4 is a flow diagram illustrating the operation of one algorithm for changing the allocation of PSTN circuits to the different switches which are served by the SCN. If service circuits are allocated along with paths, this program can also allocate the service circuits. The program starts at start block 401. Test 403 and 405 are used to go repeatedly through a loop for all the switches which share the use of service circuits from the service circuit node. When test 403 is initially entered, it is entered with the number of the initial switch. Test 403 is used to determine whether the utilization of service circuits by a particular switch exceeds the threshold for that switch. This utilization is the fraction of utilization of the PSTN circuits allocated for that switch; this fraction can be the fraction of the PSTN circuits allocated for that switch that is occupied over some reasonable period of time, such as 10 to 20 seconds. If this utilization exceeds the threshold for that switch, an attempt is made to allocate one or more additional PSTN circuits and/or service circuits to that switch, a process that is initiated in test 409. If the utilization does not exceed the threshold, test 405 checks whether the last switch has been tested and, if not, increments the switch number to be tested and reenters test 403. If test 405 determines that the last switch has already been tested, then the end block 407 has entered and other procedures may be processed. If the utilization exceeds the threshold for a switch, then test 409 is used to determine fewer than the maximum allocatable number of semi-permanent circuits have been allocated. If so, a circuit is allocated (action block 411) and test 405 is entered in order to continue or terminate the loop of testing all the switches for excess utilization. If the number of allocated circuits is already the maximum, as determined by test 409, then test 413 is used to determine whether a reduction of the number of circuits allocated to any switch would cause the utilization threshold for that switch to be exceeded. The utilization threshold for each switch is a predefined parameter stored for that switch. If there is any switch for which the reduction of the number of circuits can be made without exceeding the utilization threshold, then a circuit is deallocated from that switch and allocated to the switch whose utilization is above threshold (action block 415) and test 405 is reentered. If none of the switches can have their allocated number of circuits reduced without causing the threshold for that switch to be exceeded, then nothing can be done and end block 407 is entered. Test 409 may also be entered as a result of receiving a message (action block 421) sent (action block 307, FIG. 3) from a served switch. In that case, the return can be to end block 407 instead of entering the 403,405 loop. In order to prevent any one switch from utilizing too many service circuits, it may also be desirable, in addition to the steps described above, to limit the number of semi-permanent paths to any one switch.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of seizing one of a plurality of service circuits connectable to customer lines, said service circuits housed in a service circuit node (SCN), from one of a plurality of switching systems, said SCN for serving said plurality of switching systems, comprising the steps of:

pre-allocating a plurality of semi-permanent communication paths between said one switching system and said SCN;

establishing semi-permanent communication paths between said one switching system and said SCN for each of said pre-allocated paths;

establishing semi-permanent connections in a switching network of said SCN between the pre-allocated service circuits, each connectable to customer lines, and the established communication paths; and seizing one of said pre-allocated paths from said one switching system.

2. The method of claim 1 further comprising:
pre-allocating ones of said plurality of service circuits to calls from said one switching system.

3. The method of claim 1 further comprising:
changing the number of said pre-allocated paths for said one switching system to meet changes of demand for said service circuits from said one switching system.

4. The method of claim 3 wherein said changing said number is performed in response to a pre-programmed time indication.

5. The method of claim 3 wherein said changing said number is performed in response to utilization changes for said service circuits from said one switching system.

6. The method of claim 5 wherein said changing is performed in response to a request message from said one switch.

7. The method of claim 5 wherein said changing is performed by allocating an additional semi-permanent path if the number of allocated paths is less than a maximum for said SCN.

8. The method of claim 5 wherein said changing is performed by de-allocating a path to another switching system and allocating an additional path to said one switching system.

9. The method of claim 8 wherein said de-allocating is performed if said another switching system would have a semi-permanent path occupancy ratio below a predefined threshold if one of its paths were de-allocated.

10. The method of claim 1 wherein said establishing comprises:
establishing said communication paths from said SCN.

11. A method of seizing one of a plurality of service circuits connectable to customer lines, said service circuits housed in a service circuit node (SCN), from one of a plurality of switching systems, said SCN for serving said plurality of switching systems, comprising the steps of:
pre-allocating a plurality of semi-permanent communication paths between said one switching system and said SCN, said paths being switched via at least one intermediate switching system of a public switched network;
establishing communication paths between said one switching system and said SCN for each of said pre-allocated paths, said establishing being initiated from said SCN;
changing the number of said pre-allocated paths for said one switching system to meet changes of utilization changes for said service circuits from said one switching system;
wherein said changing is performed by de-allocating a path to another switching system and allocating an additional path to said one switching system if said another switching system would have a semi-permanent path occupancy ratio below a predefined threshold for said another switching system if one of the paths of said another switching system were de-allocated; and
seizing one of said pre-allocated paths from said one switching system.

12. A method of seizing one of a plurality of service circuits connectable to customer lines, said service circuits housed in a service circuit node (SCN), from one of a plurality of switching systems, said SCN for serving said plurality of switching systems, comprising the steps of:
pre-allocating a plurality of semi-permanent communication paths between said one switching system and said SCN;
establishing semi-permanent communication paths between said one switching system and said SCN for each of said pre-allocated paths;
establishing semi-permanent connections in a switching network of said SCN between the pre-allocated service circuits, each connectable to customer lines, and the established communication paths; and
seizing one of said pre-allocated paths from said one switching system; wherein once of said semi-permanent communication paths between said one switching system and said SCN each comprise a switchable connection in at least one switching system between said one switching system and said SCN.

* * * * *